(12) United States Patent
Sun et al.

(10) Patent No.: US 8,774,412 B2
(45) Date of Patent: Jul. 8, 2014

(54) VERIFICATION METHOD AND SYSTEM

(75) Inventors: Hung-Min Sun, Hsinchu (TW);
Man-Ting Kuo, Taichung (TW);
Yao-Hsin Chen, Taichung (TW);
Shih-Ying Chang, Nantou County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 4 days.

(21) Appl. No.: 13/290,038

(22) Filed: Nov. 4, 2011

(65) Prior Publication Data

US 2013/0039484 A1    Feb. 14, 2013

(30) Foreign Application Priority Data

Aug. 8, 2011    (TW) .............................. 100128103 A

(51) Int. Cl.
*G06F 21/00*    (2013.01)

(52) U.S. Cl.
USPC .......................................... 380/277; 382/100

(58) Field of Classification Search
USPC .......................................... 380/277; 382/100
See application file for complete search history.

(56) References Cited

U.S. PATENT DOCUMENTS

| | | | |
|---|---|---|---|
| 5,715,316 A * | 2/1998 | Steenblik et al. ................ | 380/54 |
| 6,095,566 A | 8/2000 | Yamamoto et al. | |
| 6,728,376 B1 * | 4/2004 | Dean et al. ....................... | 380/54 |
| 2004/0148298 A1 * | 7/2004 | Terasawa ........................ | 707/100 |
| 2005/0180569 A1 * | 8/2005 | Kevenaar et al. .............. | 380/213 |
| 2006/0177060 A1 * | 8/2006 | Johnson et al. ................ | 380/255 |
| 2006/0227969 A1 * | 10/2006 | Johnson et al. ................ | 380/210 |
| 2009/0323959 A1 | 12/2009 | Hara | |
| 2010/0014668 A1 | 1/2010 | Yoshioka et al. | |
| 2010/0235646 A1 | 9/2010 | Fu et al. | |
| 2011/0026716 A1 * | 2/2011 | Tang et al. ..................... | 380/284 |
| 2012/0148089 A1 * | 6/2012 | Vashistha et al. ............. | 382/100 |

FOREIGN PATENT DOCUMENTS

| | | | |
|---|---|---|---|
| EP | 0612040 A2 | 8/1994 | |
| EP | 0907150 A2 | 4/1999 | |
| TW | I234380 B | 6/2005 | |
| TW | 200949765 A | 12/2009 | |
| TW | 201013544 A | 4/2010 | |
| TW | 201040870 A | 11/2010 | |
| TW | 201103297 A | 1/2011 | |
| WO | 9618169 A1 | 6/1996 | |

OTHER PUBLICATIONS

Moni Naor, Adi Shamir Advances in Cryptology—EUROCRYPT'94,Lecture Notes in Computer Science vol. 950, 1995, pp. 1-12.*

(Continued)

*Primary Examiner* — Taghi Arani
*Assistant Examiner* — Ali Shayanfar
(74) *Attorney, Agent, or Firm* — Morris Manning & Martin LLP; Tim Tingkang Xia, Esq.

(57) ABSTRACT

The present disclosure relates to a verification method and system. The method comprises: applying an encryption algorithm to a secret information so as to generate at least two images; transmitting a first image of the at least two images to a first device; and aligning and overlaying a second image of the at least two images with the first image during the proceeding of a verification process for recovering and revealing the secret information.

30 Claims, 9 Drawing Sheets

(56) References Cited

OTHER PUBLICATIONS

Rui Shogenji_ and Junji Ohtsubo, Hiding Information Using a Checkered Pattern, Department of Systems Engineering, Faculty of Engineering, Shizuoka University, 3-5-1 Johoku, Naka-ku, Hamamatsu 432-8561, Japan, Optical Review vol. 16, No. 5 (2009) 517-520.*

McCune et al, Using Camera Phones for Human-Verifiable Authentication, May 2005, IEEE, Print ISBN: 0-7695-2339-0, pp. 110-124.*

Intellectual Property Office, Ministry of Economic Affairs, R.O.C., "Office Action", Oct. 21, 2013, Taiwan.

* cited by examiner

```
J={
  {0,0,1,1,1,1,1,1,1,1,0},
  {0,0,1,1,1,1,1,1,1,1,0},
  {0,0,1,1,1,1,1,1,1,1,0},
  {0,0,0,0,0,1,1,1,0,0,0,0},
  {0,0,0,0,0,1,1,1,0,0,0,0},
  {0,0,0,0,0,1,1,1,0,0,0,0},
  {1,1,1,0,0,1,1,1,0,0,0,0},
  {1,1,1,0,0,1,1,1,0,0,0,0},
  {1,1,1,0,0,1,1,1,0,0,0,0},
  {1,1,1,1,1,1,1,1,0,0,0,0},
  {0,1,1,1,1,1,1,1,0,0,0,0},
  {0,0,1,1,1,1,1,1,0,0,0,0},
  {0,0,0,0,0,0,0,0,0,0,0,0},
}
```

First image

Second image

US 8,774,412 B2

VERIFICATION METHOD AND SYSTEM

CROSS-REFERENCE TO RELATED APPLICATION

This non-provisional application claims priority under 35 U.S.C. §119(a) on Patent Application No. 100128103 filed in Taiwan (R.O.C.) on Aug. 8, 2011, the entire contents of which are hereby incorporated by reference.

TECHNICAL FIELD

The present disclosure relates to a verification method and system, and more particularly, to a verification method and system using a visual cryptographic algorithm.

TECHNICAL BACKGROUND

Visual cryptography is a cryptographic technique which allows visual information (pictures, text, etc.) to be encrypted in such a way that the decryption can be performed by the human visual system, without the aid of computers. Using the idea, an image is broken up into n shares so that only someone with all n shares could decrypt the image, while any n-1 shares revealed no information about the original image. Each share was printed on a separate transparency, and decryption was performed by overlaying the shares. When all n shares were overlaid, the original image would appear. Although the concept of the visual cryptography is generally accept, but it is rarely used in any actual application due to its inconvenience in usage. Operationally, a conventional visual cryptographic scheme is either performed in a way that the n shares of a secret image are printed on separate transparencies for allowing the original secret image to be revealed by overlaying the n projectors on top of one another, or in a way that an overlaying algorithm is applied on the electronic files of the n shares directly for enabling the n shares to overlay and thus reveal the original image. However, the aforesaid two ways in view of how a visual cryptographic scheme is performed are rarely used, since the former is considered to be inconvenient in usage, and the latter is short in that there is no way to confirm whether the revealed image that is directly resulting from the overlaying algorithm is genuinely equal to the overlaying of the n shares of the secret image, or is tampered by computer programming since the participants that own the n shares of the secret image in respective are incapable of participating the overlaying and verification process for revealing the original image after being asked to feed its share of electronic file to a computer operating the overlaying algorithm. Therefore, it is in need of new improved visual cryptographic scheme designed for overcoming the aforesaid shortcomings and thus widening and promoting the application of visual cryptography.

TECHNICAL SUMMARY

In an embodiment, the present disclosure provides a verification method, which comprises the steps of: applying an encryption algorithm to a secret information so as to generate at least two images accordingly; transmitting a first image of the at least two images to a first device; and aligning and overlaying a second image of the at least two images with the first image during the proceeding of a verification process for recovering and revealing the secret information.

In another embodiment, the present disclosure provides a verification system, which comprises: a processing unit, for applying a encryption algorithm to a secret information so as to generate at least two images accordingly; and a first device, for receiving a first image of the at least two images while allowing the received first image to align and overlay a second image of the at least two images during the proceeding of a verification process so as to recover and reveal the secret information.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
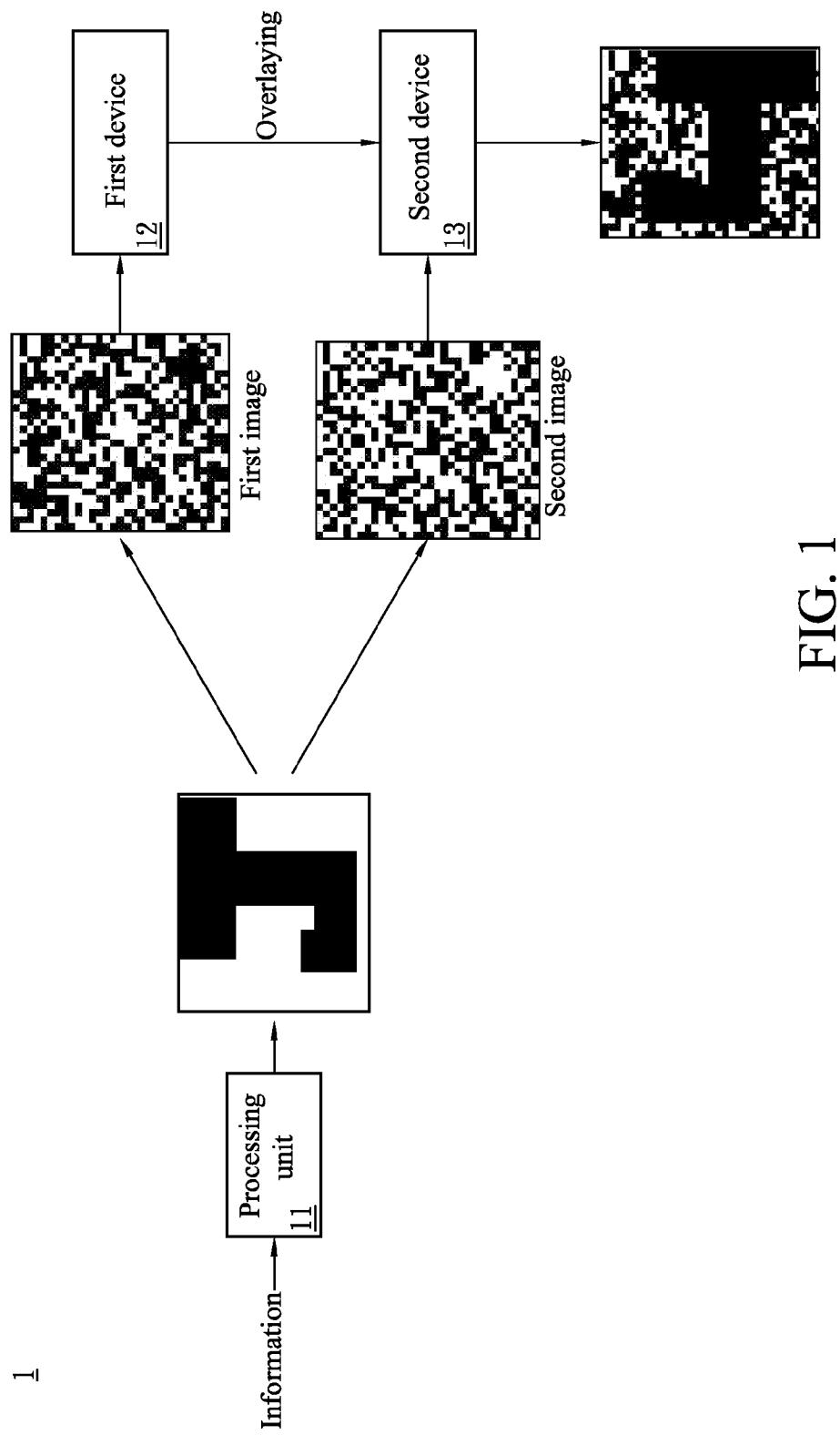
FIG. 1 is a schematic diagram showing a verification system according to an exemplary embodiment of the present disclosure.

Please refer to FIG. 1, which is a schematic diagram showing a verification system according to an exemplary embodiment of the present disclosure. As shown in FIG. 1, a verification system comprises: a processing unit 11, a first device 12 and a second device 12. The processing unit 11 is used for applying an encryption algorithm to a secret information so as to generate at least two images accordingly, in which the at least two images include a first image and a second image, and the second information can be composed of figures, texts, symbols or pictures. In this embodiment, the second information is substantially a picture of letter J, using which the processing unit 11 will first converts the second information of the letter J into a conversion image using the encryption algorithm and then applies a visual cryptographic scheme to encode the conversion image so as to generate the first image and the second image. Moreover, the conversion image can be a binary image, a grayscale image or a color image, and the conversion image is formed in a size larger than or equal to that of the secret information. It is noted that each of the black pixels and white pixels in any binary image can be represented using 0 and 1 in respective or vice versa, but it is not limited thereby. Although in this embodiment the verification system adopts the processing unit 11 for processing the secret information, in reality any device that is programmable can be used for processing the secret information the way the processing unit 11 can. For instance, any smart phone or notebook computer is quite capable of executing the encryption algorithm. In the embodiment of FIG. 1, the first device 12 is used for the first image, whereas the second device 13 is used for receiving the second image, in that each of the first device 12 and the second device 13 can be a cellular phone, a tablet computer, a notebook computer or other portable device with image capturing ability. During the proceeding of a verification process using the verification system, the first image and the second image are respectively displayed on the first and the second devices 12, 13, and thereby, by the use of the imaging capturing unit on the second device 13, the second image can be overlaid with the first image either automatically or manually so as to recover and reveal the original secret information. On the other hand, in another embodiment that is configured without the second device, the first device 12 can be used for receiving the second image directly that is to be aligned and overlaid with the first image for recovering and revealing the original secret information. Moreover, before the overlaying of the first and the second images, the first image is resized and then being attached with an alignment line so as to be used as basis for the resizing of the second image and also the aligning and overlaying of the second image with the first image. It is noted that the alignment line can be a right-angle L-shaped alignment line, a cross alignment line, a right-angle triangle-shaped alignment line, a rectangle-shaped alignment line or lines of other geometrical shapes with right angle, but is not limited thereby. In a condition that a right-angle L-shaped alignment line is adopted as the alignment line of first image, it can be disposed at a corner of the first image; and in a condition that a cross alignment line is adopted as the alignment line of first image, it can be disposed at either the center of the first image or at a side of the first image; and in a condition that a right-angle triangle-shaped alignment line is adopted as the alignment line of first image, it can be disposed corresponding to any two neighboring sides of the first image and the diagonal relating to the two neighboring sides; and in a condition that a rectangle-shaped alignment line is adopted as the alignment line of first image, it can be disposed surrounding the periphery of the first image. In addition, for enhancing the alignment between the first image and the second image, there can further be another alignment line attached to the second image to be used for the alignment. Moreover, in the present embodiment, by adjusting the resolution settings of the first and the second images, the sizes of the first and the second images in view of their length and width as well their respectively alignment lines can be adjusted accordingly. For instance, by enabling the length and the width of the first image to be magnified three times in respectively, the first image will be correspondingly being magnified by nine times. Nevertheless, during the proceeding of a verification process using the verification system, the first and the second image should be resized to conform with each other before the two can be overlaid for revealing the original secret information.

In another embodiment, the step of aligning and overlaying of the second image with the first image further comprises the steps of: displaying the second image along with the alignment line of the second image on a monitor of the second device; adjusting the distance between the second image and the first image as well as the resolutions of the two for enabling the first image and its alignment line to be displayed on the monitor of the second device; determining whether the second device is arranged parallel with the first device according to the orientations of the alignment lines of the first and the second image; and resizing the second image to conform to the size of the first image so as to be aligned and overlaid with the first image according to the alignment lines of the two. In addition, in another embodiment, the step of aligning and overlaying of the second image with the first image further comprises the steps of: displaying a predefined alignment line of a monitor of the second device; adjusting the distance between the second image and the first image as well as the resolutions of the two for enabling the first image and its alignment line to be displayed on the monitor of the second device; determining whether the second device is arranged parallel with the first device according to the orientations of the predefined alignment line of the second image and the alignment line of the first image; and resizing the second image to conform to the size of the first image while enabling the second image to be displayed so as to be aligned and overlaid with the first image. Moreover, in further another embodiment of the present disclosure, the step of aligning and overlaying of the second image with the first image further comprises the steps of: displaying the second image along with an alignment line of the second image on the second device; and manually adjusting the distance between the second image and the first image while enabling the alignment line of the first image to align with the alignment line of the second image so as to overlay the second image with the first image manually.

Figure 2:
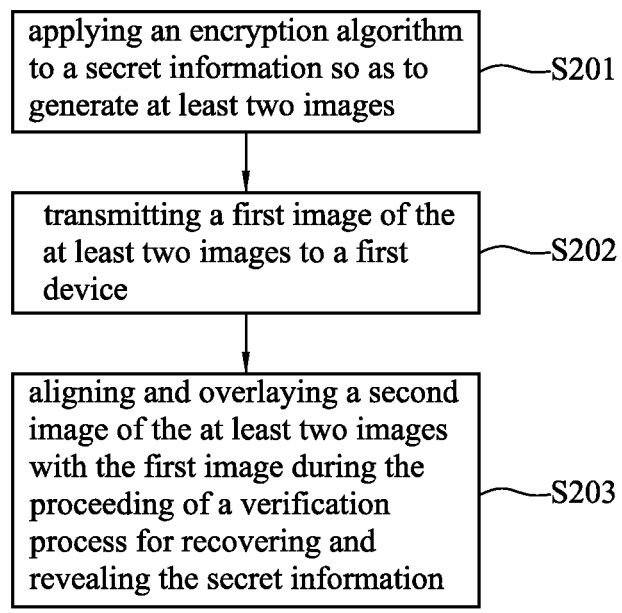
FIG. 2 is a flow chart depicting the steps performed in a verification method according to an exemplary embodiment of the present disclosure.
Figures 3A, 3B:
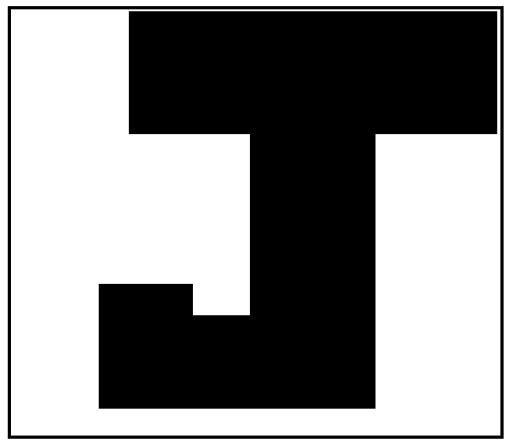
FIG. 3A to FIG. 3D are schematic diagrams showing how a first and a second image of an original secret image are generated and resized in the present disclosure.
Figure 3C:
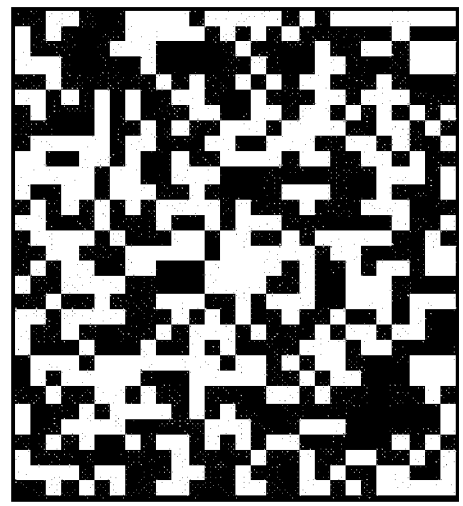
Figure 3C:
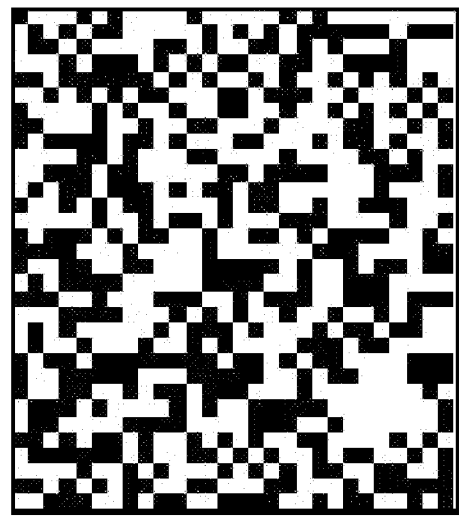
Figure 3D:
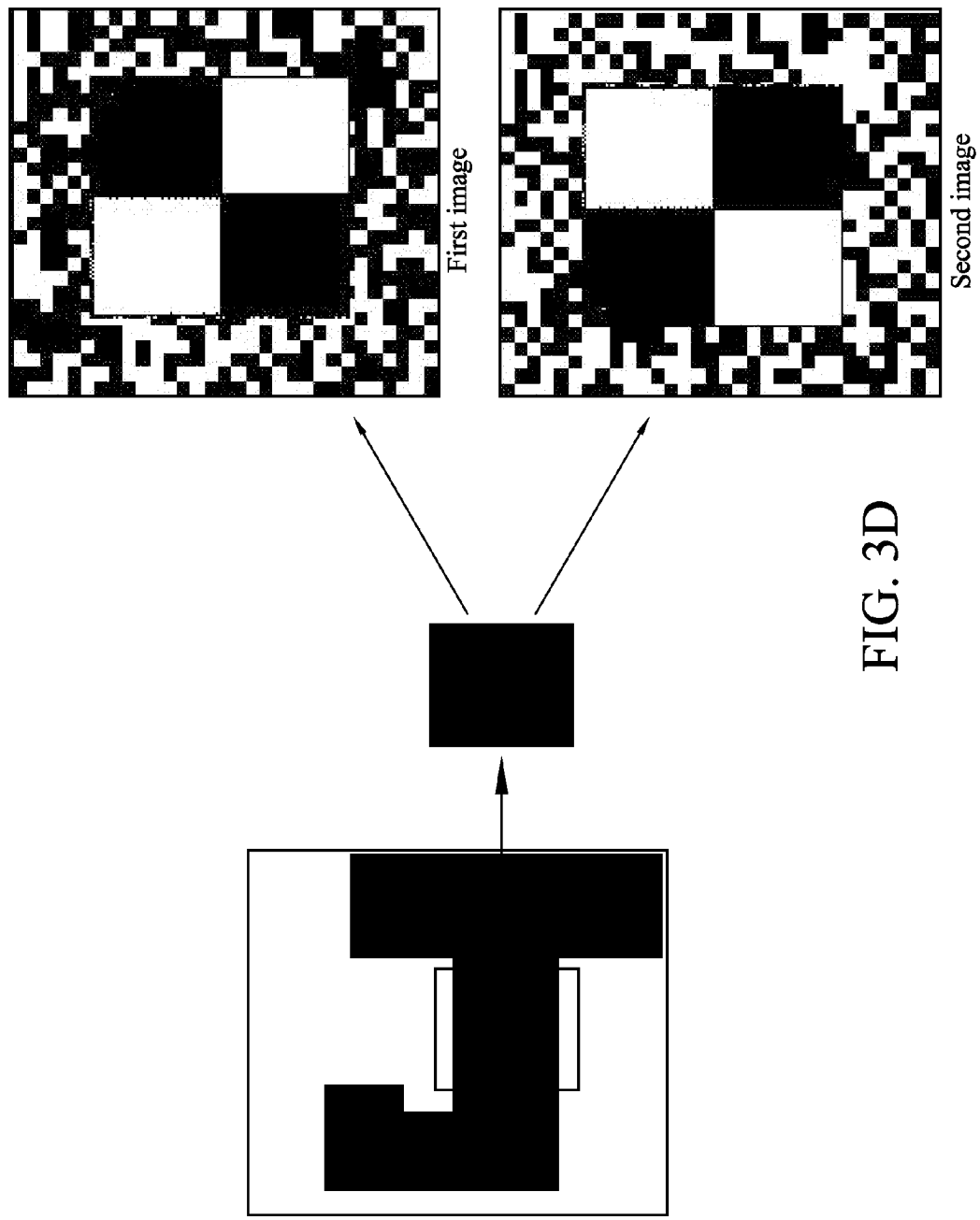

Please refer to FIG. 2, which is a flow chart depicting the steps performed in a verification method according to an exemplary embodiment of the present disclosure. In this embodiment, the verification method, which is adapted to be executed in the verification system of FIG. 1, starts from step S201. At step S201, a computation device or a first device is used for applying an encryption algorithm to a secret information so as to generate at least two images; and then the flow proceeds to step S202. Although in the present embodiment the secret information is only being encoded into two shares, i.e. a first image and a second image, it is only used for illustration and is not limited thereby, so that the secret information can be encoded into n images, including a key image and n-1 cipher images. Similarly, the secret information can be composed of: figures, texts, symbols or pictures. Operationally, the encryption algorithm can convert the secret information into a conversion image, whereas the conversion image can be a binary image, a grayscale image or a color image, and is formed in a size larger than or equal to that of the secret information. It is noted that each of the black pixels and white pixels in any binary image can be represented using 0 and 1 in respective or vice versa, but it is not limited thereby. In this embodiment, the second information is substantially a picture of letter J, which is to be converted into a binary image, as shown in FIG. 3A. Thereafter, by representing the black pixels using the digit 1 and the white pixels using the digit 0, the binary image 3A is converted into an array as shown in FIG. 3B. It is noted that the encryption algorithm can be realized using a programming language, such as java, C, C++, VB, Fortran, Matlab, Perl, Pascal, Python, Objective C, or Assembly. After the conversion of the secret information into the conversion image, a visual cryptographic scheme is used to encode the conversion image into the first image and the second image, whereas the visual cryptographic scheme can be a k-out-of-n threshold visual cryptographic scheme, k and n are non-zero integers. According to the k-out-of-n threshold visual cryptographic scheme, a secret information is encoded into n shares, and if there are k shares out of the n shares, or more than k shares that are to be overlaid, the original secret information can be recovered and thus revealed. For instance, the first and the second image that are shown in FIG. 3C are generated out of the binary image using a 2-out-of-2 threshold visual cryptographic scheme. It is noted that the sizes of the first and the second images will vary according to the type of the visual cryptographic scheme that is actually used for generating the same. To be more specific, any one pixel in the conversion image will be transformed and converted into a plurality of pixels correspondingly in the first and the second images. In the present embodiment, one pixel in the conversion image after being processed by the visual cryptographic scheme will become four pixels that are arranged as a 2×2 array correspondingly in the first and the second images, resulting that the first and the second image are respectively four times larger than the conversion image. Nevertheless, despite of converting each pixel in the conversion image into four pixels arranged as a 2×2 array, it is capable of converting each pixel in the conversion image into 2×3 array or even 3×3 array, depending upon the type of visual cryptographic scheme that is actually used. As the embodiment shown in FIG. 3D, after conversion, one black pixel in the conversion image is transformed and converted into the four pixels (0110), from top to bottom and left to right, in the first image, and the four pixels (1001) in the second image. However, since it may be difficult to align and overlay the first image and the second image when the pixels of the first and second image are too small, the first and the second images can both be resized for magnifying their pixel sizes. For instance, a resizing factor of m×n can be used for magnifying the length and width of an image into n time and m times as large, whereas m and n are non-zero integers. Thereby, each of the first image and the second image is magnified into an image that is m×n times larger than the original image.

At step S202, the first image is transmitted to the first device and the second image is transmitted to the second device; and then the flow proceeds to step S230. In this embodiment, the devices that are used in step S202 can be any device that is configured with image capturing unit and is capable of displaying images, such as cellular phones, tablet computers, notebook computers, or other portable device with image capturing ability. Moreover, operationally, the first device along with the first image can be used as base that is provided to be overlaid by the second device and the second image, or vice versa. Nevertheless, instead of using the devices capable of displaying digital images as the first device or the second device whichever is acting as base to be overlaid, those acting as base can be a piece of paper or transparency whichever has the corresponding image printed thereon, and consequently, the device that is to be overlaid on top of the base should be a device not only designed with image capturing ability, but also with software programming and executing abilities. In addition, those devices used in this step should be able to communicate with each other directly by any means, including wireless network, wired network, USB, Bluetooth, WiFi, and so on, or indirectly through the use of an interface device, such as a desktop computer or a server.

At step 203, the second image is aligned and overlaid with the first image during the proceeding of a verification process for recovering and revealing the secret information. Operationally, the overlaying of the second image with the first image can be performed using the camera that is mounted on the second device so as to recover and reveal the original secret information. In this embodiment, the first image and the second image that are stored respectively in the first device and the second device are resized into the same size as each image has L pixels in length and W pixel in width, and then the second image is enabled to be displayed on the second device while enabling the second device to capture the first image using a camera that is mounted thereon for enabling the second image to align and overlay with the captured first image, and thereby, the resulted overlaid image can be decrypted by the human visual system for revealing the original secret information. In detail, the present step is composed of two procedures, and the first procedure is a process for imaging the first image that is registered in the first device, and the following procedure is a process for aligning and overlaying the second image with the first image so as to construct an overlaid image to be decrypted by the human visual system. The following description details the operation of the aforesaid two procedures.

Figure 4A:
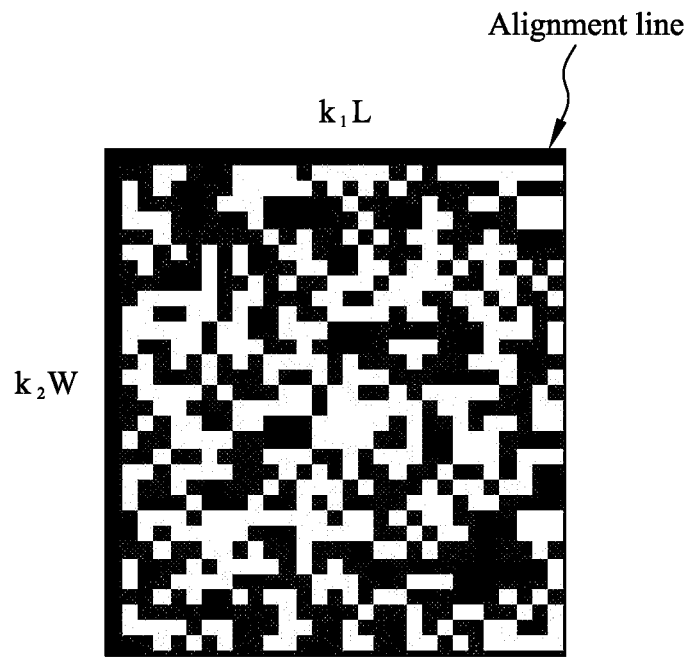
FIG. 4A to FIG. 4D are schematic diagrams showing how the first and the second images are enabled to align and overlay on one another in the present disclosure.

The first procedure is performed for imaging the image whichever is used as the base to be overlaid, that is to be the first image in this embodiment. Operationally, the first image is enabled to be displayed on a monitor of the first device while allowing the first image to be resized according to the resolution of the monitor so as to be displayed clearly on the monitor and thus facilitate the same to be overlaid by the second image. Moreover, for facilitating the resizing and overlaying, a right-angle L-shaped alignment line will be added and attached to a corner of the first image in a manner that the two bars, i.e. a vertical and a horizon lines, of the L-shaped alignment line are arranged in contact with the neighboring sides of the first image while allowing the right angle corner of the L-shaped alignment line to engage with the joint corner of the two neighboring sides. As shown in FIG. 4A, the horizontal bar of the right-angle L-shaped alignment line that is arranged in contact with the top side of the first image is formed with pL pixel in length, while the vertical bar of the right-angle L-shaped alignment line that is arranged in contact with the left side of the first image is formed with pW pixel in length. However, the right-angle L-shaped alignment line will also be resized for enabling pW=W and pL=L, that is, the right-angle L-shaped alignment line is resized to conform to the first image in length and width. Substantially, a reduce factor of $k_1 \times k_2$ is applied on the right-angle L-shaped alignment line, the length of the horizontal bar is reduced to $k_1 \times L$ for enabling the horizontal bar to be as long as the first image, and length of the vertical bar is reduced to $k_2 \times W$ for enabling the horizontal bar to be as wide as the first image. However, it is noted that the horizontal bar and the vertical bar are not necessary having to be resized to equal to the corresponding sides of the first image where there are arranged to be in contact with, or they don't even have to be arranged in contact with the two side, only if they can be arranged at a position to be compare with the first image so as to determine a resize factor for the first image. For instance, assuming the length and width of an alignment line before resizing are respectively $r_1$ times and $r_2$ time the length and width of the first image, i.e. $pL=r_1 \times L$ and $pW=r_2 \times W$, the length and width of the first image can easily obtained if the values of $r_1$ and $r_2$ are known in advance. Thereafter, the resized first image along with the right-angle L-shaped alignment line are displayed on the first device while allowing pW and pL to be slightly larger than L and W, i.e. enabling $r_1$ and $r_2$ respectively to be a value larger than 1.

Figure 4B:
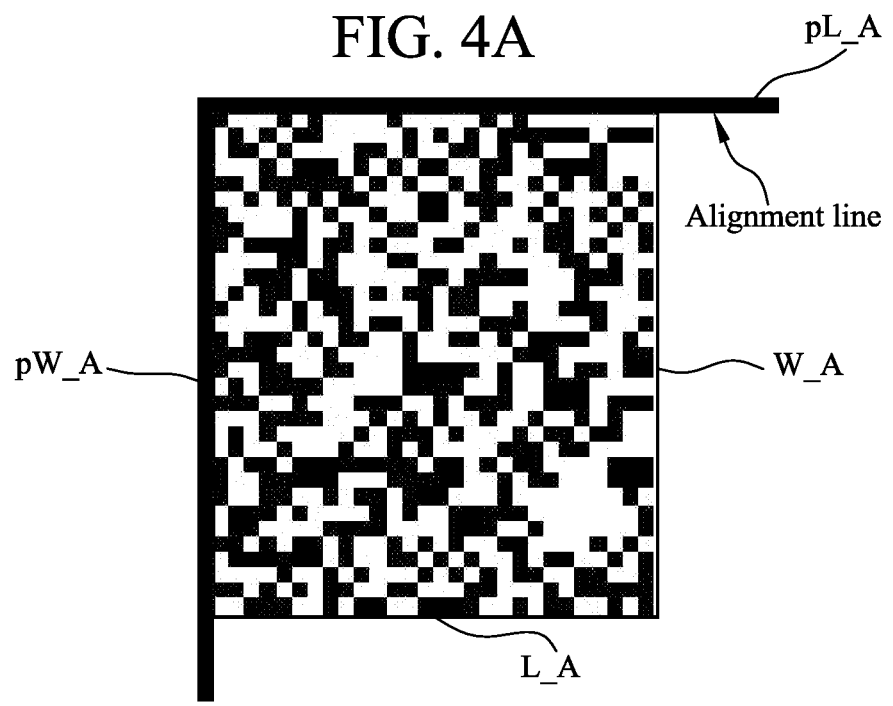
Figure 4C:
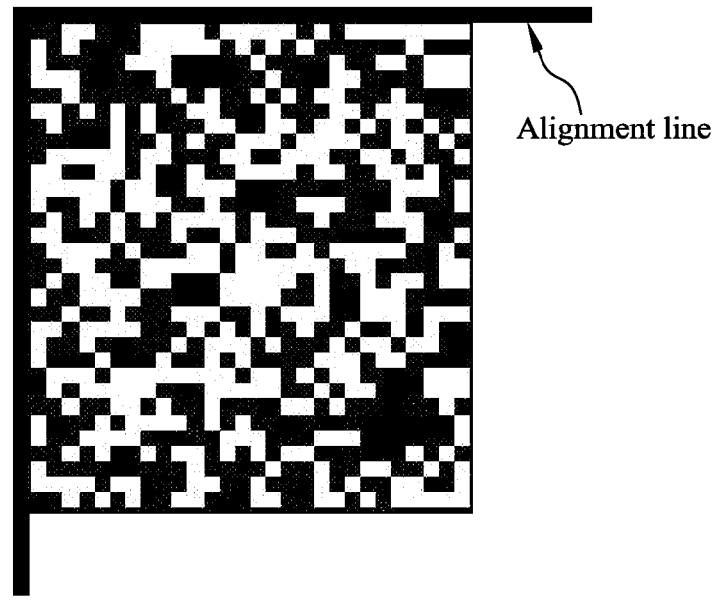
Figure 4D:
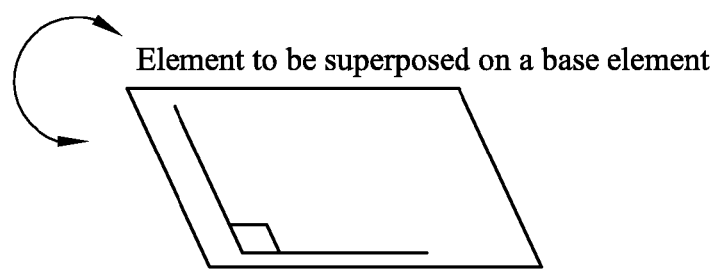
Figure 4D:
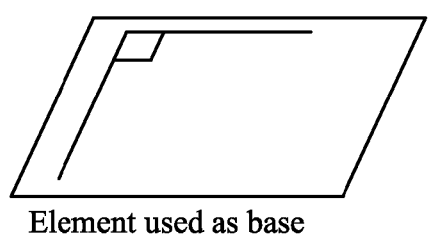
Figure 5:
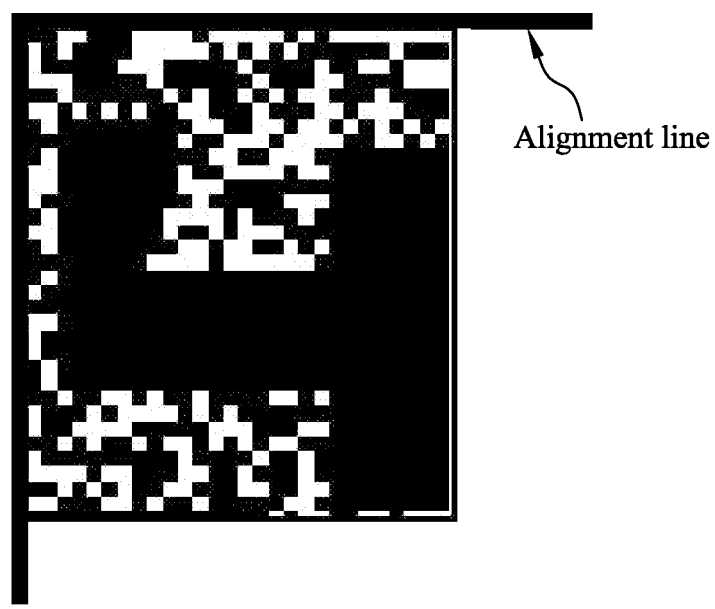
FIG. 5 is a schematic diagram showing the original secret image that is recovered and revealed from the overlaying of the first and the second images in the present disclosure.

The procedure following the aforesaid first procedure, i.e. the second procedure, is performed for aligning and overlaying images so as to achieve an overlaid image. In this embodiment, the second image is applied overlaying on top of the first image of the first device, whereas the first image is used acting as a base, and thereby, the resulting overlaid image can be decrypted by the human visual system. Operationally, an image alignment means is used, which comprises the steps of: displaying the second image along with a right-angle L-shaped alignment line on a monitor of the second device, as shown in FIG. 4B; adjusting the distance between the second image and the first image as well as the resolutions of the two for enabling the first image and its alignment line to be displayed on the monitor of the second device, as shown in FIG. 4C; determining whether the second device is arranged parallel with the first device according to the orientations of the alignment lines of the first and the second image; and resizing the second image to conform to the size of the first image while enabling the second image to be displayed so as to be aligned and overlaid with the first image. It is noted that if the second device is not arranged parallel with the first device, the so-obtained resize factor will not be correct. In another word, if the right-angle L-shaped alignment line of the first image did not appear to be two bars jointed by a right angle on the second device, the second device is not arranged parallel with the first device, as shown in FIG. 4D. The determination of whether the joint angle of the right-angle L-shaped alignment line of the first image that appears on the second device is indeed a right angle can be made either by a human visual system, or by overlaying the right-angle L-shaped alignment line of the second image on the right-angle L-shaped alignment line of the first image for evaluating whether the vertical bars match with each other and the horizontal bars also match with each other, or for evaluating whether the he joint angle of the right-angle L-shaped alignment line of the first image is equal to the he joint angle of the right-angle L-shaped alignment line of the second image. After confirming that the second device is arranged parallel with the first device, the second device is enabled to use a camera that is mounted thereon to capture the first image that is displayed on the first device, and thus the captured first image is analyzed for obtaining a resize factor relating to the first image. For instance, as shown in FIG. 4B, the horizontal alignment line on the top side of the first image is formed in a length of pL_A pixels and vertical alignment line on the left side of the first image is formed in a length of pW_A pixels, and thereby, the resize factor relating to the first image can be defined to be W_A×L_A, as referring to the values of $r_1$ and $r_2$ that are known to the second device in advance. It is noted that each of the values of $r_1$ and $r_2$ can be set to be a fixed value that is not going to change with the varying of devices being used, and in this embodiment, each of the values of $r_1$ and $r_2$ is set to be 1, i.e. the length and width of the alignment line are equal to those of its corresponding image. Moreover, the resize factor relating to the first image, i.e. W_A×L_A, can be obtained by directly applying an image analysis technique upon the first image. In another word, the aforesaid right-angle L-shaped alignment lines are used for determining whether the first and the second devices are arranged parallel with each other and also for determining whether the two images are orientated correctly, so that the orientations of the devices as well as those of the images can be adjusted accordingly. In addition, the resize factor obtained from the image analysis technique can be used directly for obtain information relating to the length and width of the first image, and then by the use of the foregoing information of the first image, the resize factor of the second image that is stored in the second device is defined to be W−A/W×L−A/L, thereby, the second image can be resized to conformed to the size of the first image that is being captured by the camera of the second device so as to overlay perfectly the second image on the first image. That is, the second image whose raw size is W×L should be resized into W_A×L_A so as to match exactly with the size of the captured first image while allowing the second image to overlay perfectly with the captured first image. After the aforesaid resizing, the overlaying of the two images is achieved if the relative positioning of the two devices remain unchanged. However, if the relative positioning of the two devices did change due to hand shaking or other factors, the user can simply adjusting the orientations of the two devices for realigning the two to be arranged parallel with each other, or waiting for a specific period of time for allowing the second device to capture the first image again so as to repeat the aforesaid procedures. It is noted that after the two images are aligned and overlaid, the secret information can be revealed, as shown in FIG. 5.

In another embodiment, the second procedure can be performed differently using an automatic alignment means, which comprises the steps of: displaying a predefined right-angle L-shaped alignment line of a monitor of the second device; adjusting the distance between the second image and the first image as well as the resolutions of the two for enabling the first image and its alignment line to be displayed on the monitor of the second device, as shown in FIG. 4C; determining whether the second device is arranged parallel with the first device according to the orientations of the predefined alignment line of the second image and the alignment line of the first image, as shown in FIG. 4D; and resizing the second image to conform to the size of the first image while enabling the second image to be displayed so as to be aligned and overlaid with the first image. It is noted that if the second device is not arranged parallel with the first device, the so-obtained resize factor will not be correct. In another word, if the right-angle L-shaped alignment line of the first image did not appear to be two bars jointed by a right angle on the second device, the second device is not arranged parallel with the first device, as shown in FIG. 4D. The determination of whether the joint angle of the right-angle L-shaped alignment line of the first image that appears on the second device is indeed a right angle can be made either by a human visual system, or by overlaying the right-angle L-shaped alignment line of the second image on the right-angle L-shaped alignment line of the first image for evaluating whether the vertical bars match with each other and the horizontal bars also match with each other, or for evaluating whether the he joint angle of the right-angle L-shaped alignment line of the first image is equal to the he joint angle of the right-angle L-shaped alignment line of the second image. After confirming that the second device is arranged parallel with the first device, the second device is enabled to capture the first image that is displayed on the monitor of the first device, and thus the captured first image is analyzed for obtaining a resize factor relating to the first image. For instance, as shown in FIG. 4B, the horizontal alignment line on the top side of the first image is formed in a length of pL_A pixels and vertical alignment line on the left side of the first image is formed in a length of pW_A pixels, and thereby, the resize factor relating to the first image can be defined to be W_A×L_A. Accordingly, the resize factor obtained from the image analysis technique can be used directly for obtain information relating to the length and width of the first image, and then by the use of the foregoing information of the first image, the resize factor of the second image that is stored in the second device can be obtained, and thereby, the second image can be resized to conformed to the size of the first image that is being captured by the camera of the second device so as to overlay perfectly the second image on the first image. That is, the second image whose raw size is W×L should be resized into W_A×L_A so as to match exactly with the size of the captured first image while allowing the second image to overlay perfectly with the captured first image. After the aforesaid resizing, the overlaying of the two images is achieved if the relative positioning of the two devices remain unchanged. However, if the relative positioning of the two devices did change due to hand shaking or other factors, the user can simply adjusting the orientations of the two devices for realigning the two to be arranged parallel with each other, or waiting for a specific period of time for allowing the second device to capture the first image again so as to repeat the aforesaid procedures. It is noted that after the two images are aligned and overlaid, the secret information can be revealed, as shown in FIG. 5.

In addition, in another embodiment, the second procedure can further be performed differently using a manual alignment means, by which the distance between the two devices are adjusted manually in view of resizing the first image that is being captured by the second device, and also in view of adjusting the positioning of the captured first image in the monitor of the second device according to the distance between the two devices. The manual alignment means comprises the steps of: displaying the second image along with an alignment line of the second image on the second device; and manually adjusting the distance between the second image and the first image and the positioning of the two while enabling the alignment line of the first image to align with the alignment line of the second image so as to overlay the second image perfectly with the first image. It is noted that, after the two images are aligned and overlaid, the secret information can be revealed.

In another embodiment, the first device that is acting as the base to be overlaid is enabled to provide information relating to the size of its corresponding first image to the second device for enabling the same to define a resize factor accordingly so as to be used for resizing the second image and thus enabling the second image to align and overlay with the first image. Moreover, the first device that is acting as the base to be overlaid is enabled to transmit the corresponding first image directly to the second device where it is to be aligned and overlaid by the second image, resulting that the secret information is revealed.

Figure 6A:
FIG. 6A to FIG. 6C are schematic diagrams showing one exemplary application of the present disclosure.
Figure 6B:
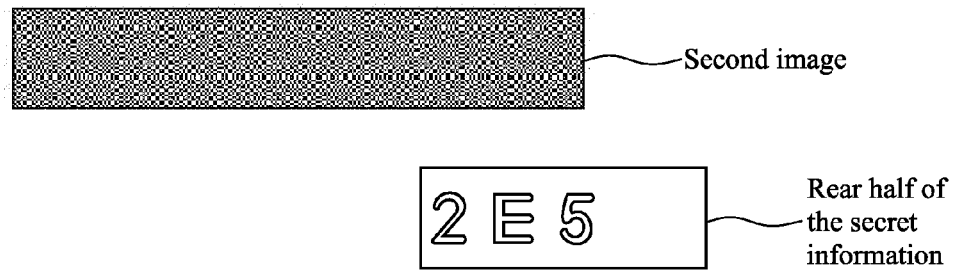
Figure 6C:
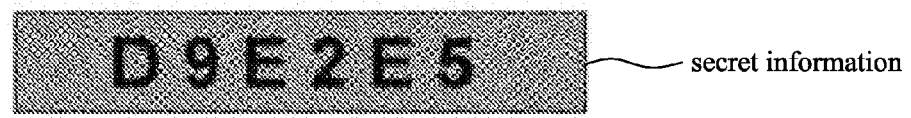

Nevertheless, for further improving the safety of verification, in addition to the encoding of a secret information into the first image and the second image, the secret information that is composed of digits and texts is divided into two halves, i.e. a front half and a rear half, whereas the front half is transmitted along with the first image to the first device that is acting as the base to be overlaid, while the rear half is transmitted along with the second image to the first device. Thus, after the second image is aligned and overlaid with the first image for achieving an overlaid information, the first device is able to perform an examination upon the overlaid information based on its front half for determining whether the overlaid information is conformed with the secret information, and thus preventing the possibility that any of the two image can be tampered during the verification process. As shown in FIG. 6A, the front half is transmitted along with the first image to the first device. As shown in FIG. 6B, the rear half is transmitted along with the second image to the second device. After overlaying the second image with the first image, an overlaid information is revealed, as shown in FIG. 6C. Thereafter, any users operating the first device and the second device are able to see and check respectively whether or not the front half of the overlaid information matches with the front half of the secret information, or whether or not the rear half of the overlaid information matches with the rear half of the secret information.

On the other hand, it is quite feasible for allowing the complete code containing in the secret information to be transmitted only to either the first device or the second device, by that the one which own the complete code is able to see and check whether or not the overlaid information matches with the secret information, and thus preventing the possibility that any of the two image can be tampered during the verification process. For instance, in a net trading, the seller will possess the secret information with the complete code as well as the first image that is resulting from the secret information after being encoded, while the buyer will possess only the second image; and during the carry on of the trading, an overlaid information can be revealed by overlaying the second image with the first image. Consequently, since the seller owns the complete code of the secret information, he/she can confirm whether or not the overlaid information matches with the secret information, and thus he/she can be aware of whether the second image is a counterfeit or not, so that the safety of the trading can be ensured.

In an embodiment of the present disclosure, in a condition when the alignment line of the second image is shift and thus misplaced, or the aligning of the second image with the first image is difficult to proceed due to hand shaking or other factors, the second device will be enabled to issue an alarm signal for reminding a user that the second image is failed to align with the first image, or the second device is not arranged parallel with the first device.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A verification method, comprising the steps of:
    applying an encryption algorithm by a hardware processor to a secret information so as to generate at least two images accordingly;
    transmitting a first image of the at least two images to a first device; and
    aligning and overlaying a second image of the at least two images with the first image during the proceeding of a verification process for recovering and revealing the secret information;
    wherein before the aligning and overlaying, each of the first image and the second image is attached with a right-angle L-shaped alignment line so as to be used as basis for the aligning and overlaying of the second image with the first image; and
    wherein before the overlaying of the first and the second images, the first image is resized and then being attached with the alignment line so as to be used as basis for the resizing of the second image and the aligning and overlaying of the second image with the first image.

2. The verification method of claim 1, further comprising the step of:
    outputting the second image to a second device while allowing the first image to align and overlay with the second image.

3. The verification method of claim 2, wherein the second device is a piece of paper or a transparency.

4. The verification method of claim 1, further comprising the step of:
 transmitting the second image to the first device for allowing the second image to align and overlay with the first image through the first device.

5. The verification method of claim 1, further comprising the step of:
 dividing the secret information into two shares, a first share and a second share, while allowing the first share to be transmitted to the first device;
 aligning and overlaying the second image with the first image for recovering and revealing an overlapped information; and
 comparing the overlapped information with the first share so as to determine whether the overlapped information conforms to the secret information.

6. The verification method of claim 5, further comprising the step of:
 comparing the overlapped information with the second share so as to determine whether the overlapped information conforms to the secret information.

7. The verification method of claim 1, further comprising the step of:
 transmitting the secret information to the first device;
 aligning and overlaying the second image with the first image for recovering and revealing an overlapped information; and
 comparing the overlapped information with the secret information so as to determine whether the overlapped information conforms to the secret information.

8. The verification method of claim 1, wherein the secret information is composed of: figures, texts, symbols or pictures.

9. The verification method of claim 1, wherein the encryption algorithm is programmed to performed the steps of:
 converting the secret information into a conversion image; and
 using a visual cryptographic scheme to encode the conversion image into the first image and the second image.

10. The verification method of claim 9, wherein the conversion image is an image selected from the group consisting of: a binary image, a grayscale image and a color image.

11. The verification method of claim 10, wherein the conversion image is formed in a size larger than or equal to that of the secret information.

12. The verification method of claim 1, wherein the first device is a device selected from the group consisting of: a cellular phone, a tablet computer and a notebook computer.

13. The verification method of claim 1, wherein an alarm signal is issued when the second image is not aligned to the alignment line of the first image.

14. The verification method of claim 1, further comprising the step of:
 transmitting the second image to a second device; and
 aligning and overlaying the second image with the first image by the help of a camera that is mounted on the second device.

15. The verification method of claim 14, wherein the step of aligning and overlaying of the second image with the first image further comprises the steps of:
 displaying the second image along with an alignment line of the second image on a monitor of the second device;
 adjusting the distance between the second image and the first image as well as the resolutions of the two for enabling the first image and its alignment line to be displayed on the monitor of the second device;
 determining whether the second device is arranged parallel with the first device according to the orientations of the alignment lines of the first and the second image; and
 resizing the second image to conform to the size of the first image so as to be aligned and overlaid with the first image according to the alignment lines of the two.

16. The verification method of claim 14, wherein the step of aligning and overlaying of the second image with the first image further comprises the steps of:
 displaying a predefined alignment line of a monitor of the second device;
 adjusting the distance between the second image and the first image as well as the resolutions of the two for enabling the first image and its alignment line to be displayed on the monitor of the second device;
 determining whether the second device is arranged parallel with the first device according to the orientations of the predefined alignment line of the second image and the alignment line of the first image; and
 resizing the second image to conform to the size of the first image while enabling the second image to be displayed so as to be aligned and overlaid with the first image.

17. The verification method of claim 14, wherein the step of aligning and overlaying of the second image with the first image further comprises the steps of:
 displaying the second image along with an alignment line of the second image on the second device; and
 manually adjusting the distance between the second image and the first image while enabling the alignment line of the first image to align with the alignment line of the second image so as to overlay the second image with the first image.

18. A verification system, comprising:
 a processing unit, for applying an encryption algorithm to a secret information so as to generate at least two images accordingly; and
 a first device, for receiving a first image of the at least two images while allowing the received first image to align and overlay a second image of the at least two images during the proceeding of a verification process so as to recover and reveal the secret information;
 wherein each of the first image and the second image is attached with a right-angle L-shaped alignment line so as to be used as basis for the first image to align and overlay the second image; and
 wherein before the overlaying of the first and the second images, the first image is resized and then being attached with an alignment line so as to be used as basis for the resizing of the second image and the aligning and overlaying of the second image with the first image.

19. The verification system of claim 18, wherein the first device is used for receiving the second image while enabling the second image to align and overlay with the first image.

20. The verification system of claim 18, wherein the secret information is composed of: figures, texts, symbols or pictures.

21. The verification system of claim 18, wherein the encryption algorithm is programmed to performed the steps of:
 converting the secret information into a conversion image; and
 using a visual cryptographic scheme to encode the conversion image into the first image and the second image.

22. The verification system of claim 21, wherein the conversion image is an image selected from the group consisting of: a binary image, a grayscale image and a color image.

23. The verification system of claim 22, wherein the conversion image is formed in a size larger than or equal to that of the secret information.

24. The verification system of claim 18, wherein the first device is a device selected from the group consisting of: a cellular phone, a tablet computer and a notebook computer.

25. The verification system of claim 18, further comprising:
a second device, for receiving the second image while enabling a camera that is mounted on the second device to be used for aligning and overlaying the second image with the first image.

26. The verification system of claim 25, wherein an alarm signal is displayed on the second device when the second image is not aligned to the alignment line of the first image.

27. The verification system of claim 25, wherein the step of aligning and overlaying of the second image with the first image further comprises the steps of:
displaying the second image along with an alignment line of the second image on a monitor of the second device;
adjusting the distance between the second image and the first image as well as the resolutions of the two for enabling the first image and its alignment line to be displayed on the monitor of the second device;
determining whether the second device is arranged parallel with the first device according to the orientations of the alignment lines of the first and the second image; and
resizing the second image to conform to the size of the first image so as to be aligned and overlaid with the first image according to the alignment lines of the two.

28. The verification system of claim 25, wherein the step of aligning and overlaying of the second image with the first image further comprises the steps of:
displaying a predefined alignment line of a monitor of the second device;
adjusting the distance between the second image and the first image as well as the resolutions of the two for enabling the first image and its alignment line to be displayed on the monitor of the second device;
determining whether the second device is arranged parallel with the first device according to the orientations of the predefined alignment line of the second image and the alignment line of the first image; and
resizing the second image to conform to the size of the first image while enabling the second image to be displayed so as to be aligned and overlaid with the first image.

29. The verification system of claim 25, wherein the step of aligning and overlaying of the second image with the first image further comprises the steps of:
displaying the second image along with an alignment line of the second image on the second device; and
manually adjusting the distance between the second image and the first image while enabling the alignment line of the first image to align with the alignment line of the second image so as to overlay the second image with the first image.

30. The verification system of claim 18, wherein the processing unit is a programmable device.

* * * * *